United States Patent
aus der Funten et al.

[11] 3,864,382
[45] Feb. 4, 1975

[54] PROCESS FOR THE PREPARATION OF NITRILES CONTAINING AMINO GROUPS

[75] Inventors: Helmut aus der Funten, Mondorf; Hermann Richtzenhain, Schwellenbach, both of Germany

[73] Assignee: Dynamit Nobel AG, Troisdorf, Germany

[22] Filed: Feb. 12, 1970

[21] Appl. No.: 11,020

[30] Foreign Application Priority Data
Feb. 26, 1969 Germany............................ 1908466

[52] U.S. Cl........... 260/465 E, 260/464, 260/465.5, 260/465 K, 260/465 R, 260/585 C
[51] Int. Cl..................... C07c 121/42, C07c 121/78
[58] Field of Search......... 260/465 E, 465.5, 585 C, 260/465 D, 464

[56] References Cited
UNITED STATES PATENTS

| | | | |
|---|---|---|---|
| 2,208,598 | 7/1940 | Rigby............................ | 260/465.5 X |
| 2,245,129 | 6/1941 | Greenewalt.................... | 260/465.5 X |
| 2,518,659 | 8/1950 | Brimer et al.................... | 260/585 X |
| 3,322,815 | 5/1967 | Feldman........................ | 260/465.5 |
| 3,522,309 | 7/1970 | Kirby............................ | 260/585 X |

Primary Examiner—Lewis Gotts
Assistant Examiner—Dolph H. Torrence
Attorney, Agent, or Firm—Burgess, Dinklage & Sprung

[57] ABSTRACT

Production of amino nitriles of the formula:

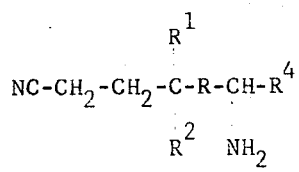

wherein R is $-CH_2-CHR^3-$ by catalytic amination hydrogenation of a compound of the formula:

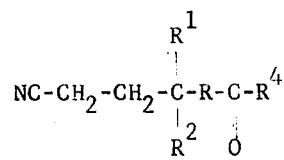

wherein R is $-CH=CR^3-$ or $-CH_2-CHR^3-$;
$R^1$ and $R^2$ are the same or different and each are an alkyl group of 1 to 4 carbon atoms;
$R^3$ is hydrogen or an alkyl group of 1 to 4 carbon atoms; and
$R^4$ is hydrogen, an alkyl group of 1 to 4 carbon atoms or an aryl group and wherein $R^3$ and $R^4$ together with the carbon atoms to which they are connected may form a 5 or 6 carbon atom containing ring in the presence of at least stoichiometric quantities of ammonia, hydrogen pressure of at least 50 atmospheres, temperature of about 60° to 180°C, preferably 100° to 140°C wherein the catalyst is platinum or palladium instead of the known nickel, cobalt or rhodium.

5 Claims, No Drawings

PROCESS FOR THE PREPARATION OF NITRILES CONTAINING AMINO GROUPS

It is known that nitriles which contain an aldehyde or keto group are transformed to diamines when catalytically hydrogenated, in the presence of ammonia, with hydrogenation of the nitrile group and simultaneous aminative hydrogenation of the carbonyl group (Belgian Pat. No. 697,697; C. R. Acad. Sci. Ser. C 267 (1968) 93–96). For this hydrogenation to form the diamine, catalysts of the prior art are used, such as Raney nickel and Raney cobalt, supported nickel or cobalt, or supported rhodium. The hydrogenation is performed at temperatures of 50° to 200°C, preferably 70° to 130°C, under elevated hydrogen pressure.

The catalytic hydrogenation of aliphatic and aromatic nitriles in the presence of supported or unsupported noble metal catalysts such as Pt or Pd has been described many times (N.P. Rylander, Catalytic Hydrogenation over Platinum Metals, Academic Press, New York and London, 1967, pp. 203 to 224). The nitrile group is hydrogenated in the presence of ammonia mostly to the primary amino group as well (ibidem, pp. 204, 208 and 209).

It has now surprisingly been found that, by using platinum and/or palladium catalysts instead of catalysts containing nickel, cobalt or rhodium, hydrogenation of carbonyl-group-containing nitriles of the general formula

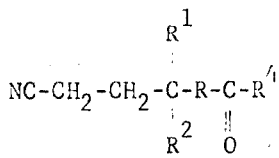

wherein R is —CH=CR$^3$— or —CH$_2$—CHR$^3$—;

R$^1$ and R$^2$ are the same or different and each are an alkyl group of 1 to 4 carbon atoms;

R$^3$ is hydrogen or an alkyl group of 1 to 4 carbon atoms; and

R$^4$ is hydrogen, an alkyl group of 1 to 4 carbon atoms or an aryl group and wherein R$^3$ and R$^4$ together with the carbon atoms to which they are connected may form a 5 or 6 carbon atom containing ring does not attack the nitrile group but rather only converts the carbonyl group into an amine while the nitrile group remains unaffected, so that amino-group-containing nitriles are formed.

The unsaturated aldonitriles and ketonitriles used as starting material for the present invention and having the above general formula can be obtained by condensing α,α-dimethyl-γ-cyanobutyraldehyde with aldehydes or ketones according to French Pat. No. 1,521,222. The following can be given as examples of such compounds:

6-cyano-4,4-dimethylhexene-2-al-1,
6-cyano-2,4,4-trimethylhexene-2-al-1,
6-cyano-4,4-dimethyl-2-phenylhexene-2-al-1,
5,5-dimethyl-7-cyano-heptene-3-one-2,
5-ethyl-5-n-butyl-7-cyano-heptene-3-one-2,
3,5,5-trimethyl-7-cyano-heptene-3-one-2,
3-methyl-5-ethyl-5-n-butyl-7-cyano-heptene-3-one-2,
2,6,6-trimethyl-7-cyan-octene-4-one-3,
2,7,7-trimethyl-9-cyano-nonene-5-one-4,
phenyl-(3,3-dimethyl-5-cyano-pentene-(1)-yl)-ketone,
phenyl-(3-ethyl-3-n-butyl-5-cyano-pentene-(1)-yl)-ketone,
2-(2,2-dimethyl-4-cyanobutylidene)-cyclohexanone,
2-(2-ethyl-2-n-butyl-4-cyanobutylidene)-cyclohexanone,
3-isopropyl-5,5-dimethyl-7-cyanoheptene-3-one-2, etc.

Instead of the unsaturated nitriles containing carbonyl groups, the saturated, carbonyl-group-containing nitriles obtained therefrom by the selective hydrogenation of the C=C double bond according to the method of Belgian Pat. No. 717,306 can be subjected to the aminative hydrogenation according to this invention. Suitable compounds of this type are:

5,5-dimethyl-7-cyanoheptanone-2,
5-ethyl-5-n-butyl-7-cyanoheptanone-2,
3,5,5-trimethyl-7-cyanoheptanone-2,
3-methyl-5-ethyl-5-n-butyl-7-cyanoheptanone-2,
2,6,6-trimethyl-8-cyanoctanone-3,
phenyl-(3,3-dimethyl-5-cyanopentyl)-ketone,
phenyl-(3-ethyl-3-n-butyl-5-cyanopentyl)-ketone,
2-(2,2-dimethyl-4-cyanobutyl)-cyclohexanone,
2-(2-ethyl-2-n-butyl-4-cyano-butyl)-cyclohexanone,
2,7,7-trimethyl-9-cyanononanone-4, and
5,5-diemthyl-3-isopropyl-7-cyanoheptanone-2.

The aminative hydrogenation of the saturated or unsaturated carbonyl-group-containing nitriles is performed by a per se known process but using as the catalysts platinum and/or a palladium. The catalysts can be used either in the metallic or the oxide form, supported or unsupported. Advantageous supports are carbon, Al$_2$O$_3$, CaCO$_3$, BaSO$_4$. The amount of noble metal on the support is not critical. In practice, commercially availabe catalysts having a noble metal content of 0.3 to 10 percent by weight are used. Whereas the speed of the reaction depends on the catalyst concentration, the catalyst concentration has very little influence on the composition of the product. To achieve economical hydrogenation rates, an average of 1 percent by weight of the catalyst (with reference to the substrate) suffices, and in the case of smaller batches, the amount of catalyst has to be increased accordingly.

To achieve a high hydrogenation speed it is advantageous to hydrogenate at an elevated hydrogen pressure. The purity of the hydrogen can be such as is commonly used for hydrogenation purposes, and a certain amount of inert gases does not interfere with the reaction. The hydrogen is also used in an at least stoichiometric quantity. To maintain a high hydrogenation speed it is desirable to use an excess of hydrogen at the stated pressure.

The reaction, in the case of the non-fluid reactants, is advantageously performed in an inert solvent. The preferred solvents are lower alcohols, such as methanol, ethanol or isopropanol. Other inert solvents can also be used, such as ethers, examples being tetrahydrofuran, 1,4-dioxane or 1,2-dimethoxyethane.

For the selective reduction amination of the carbonyl group, the presence of an at least stoichiometric amount of ammonia is required. The hydrogenation is performed preferably in the presence of a stoichiometric excess ammonia. Instead of the above-named solvents, liquid ammonia can advantageously be used as the solvent.

If the unsaturated nitriles containing carbonyl groups are used for the preparation of the aminonitriles, it is advantageous first to perform a preliminary hydrogenation in the presence of the catalysts without the addition of ammonia, and after the amount of hydrogen necessary for the saturation of the carbon double bond has been absorbed, the ammonia may be added in liquid or gas form. To achieve a good yield, it is necessary in this case to perform the selective olefin hydrogenation in the absence of ammonia at temperatures of $-20°$ to $+70°C$, preferably $0°$ to $40°C$. The temperature can, however, be above or below these limits in individual cases. The hydrogenation of the nitriles containing carbonyl groups can be varied over a wide range. The temperature range of $50°$ to $180°C$, preferably $100°$ to $140°C$, has proven advantageous.

The hydrogen pressure is not of decisive importance for the preparation of the aminonitriles. To achive satisfactory hydrogenation speeds, pressures above 50 atmospheres are used as a rule. At pressures above 150 atmospheres, especially in the upper ranges of the stated temperatures, it becomes possible that the nitrile group might be attacked.

The working up of the reaction product is extremely simple, since all that needs to be done is to filter out the catalyst and purify the reaction product by vacuum distillation.

In addition to the aminonitriles that develop as the principal product according to the invention, secondary amines of higher boiling point are formed, which can easily be separated by distillation on the basis of their higher boiling point.

The aminonitriles according to the invention are valuable intermediates for the manufacture of plastics and pharmaceutical products. They are furthermore suitable for the stabilization of chlorinated hydrocarbons, silicones and other such products requiring stabilization.

The process and the products according to the present invention are illustrated by the following examples.

EXAMPLE 1

15 g of a palladium catalyst (5 percent palladium by weight on calcium carbonate) were placed under nitrogen together with 500 ml of ethanol in a 5-liter autoclave with a magnetic stirrer, and activated with hydrogen at 15 atmospheres gauge pressure for 10 minutes at room temperature. After the addition of a solution of 500 g of 5,5-dimethyl-7-cyanoheptanone-2 and 500 ml of ethanol, the autoclave was again briefly scavenged with hydrogen; then 280 g of ammonia was put in and the pressure was increased with hydrogen to 100 atmospheres. In the heating that followed, the pressure at first increased and then began to drop, slowly after $65°C$, and more rapidly at $100°$ to $120°C$. The pressure drop created by the absorption of hydrogen was compensated for by constant additions of hydrogen at about the 100 to 130 atmosphere range. The absorption of hydrogen had substantially ended after 2 hours. The excess hydrogen and ammonia were slowly let off after cooling, the contents of the autoclave was filtered free of catalyst under nitrogen, and the filtrate was fractionally distilled. After the ammonia and ethanol were distilled off, two fractions were abtained:

1. $68° - 135°C$ /o 8 Torr; 294 g,
2. $182° - 223°C$ /o 8 Torr; 132 g.

After a purifying distillation through a packed, metallized 50 cm column, the first fraction yielded 2-amino-5,5-dimethyl-7-cyanoheptane, B.P. $92°-95°C$ /o 4 Torr.

Yield: 285.5 g (56,8 percent of the theory) $n_d^{20}$: 1.4564 $C_{10}H_{20}N_2$ (mol. wt. 168)

Calculated: C, 71.49%; H, 11.89%; N, 16.66% (Dumas), N, 8.33% (van Slyke)

Found: C, 71.77%; H, 11.68%; N, 16.67% (Dumas) N, 8.65% (van Slyke)

Oxalate: $(C_{22}H_{42}N_4O_4)$ (2 moles aminoitrile and 1 mole oxalic acid) (Mol. wt. 426).

Calculated: C, 61.99%; H, 9.85%; N, 15.00%.

Found: C, 61.85%; H, 9.68%; N, 14.72% M.P. $223°-224°C$ (decomp.) from alcohol-water solution.

After distillation through a metallized Vigreux column 20 cm long, the 2nd fraction yielded 128.8 grams of a substance having a boiling point of $180°-184°C$ /o 3 Torr.

EXAMPLE 2

14.0 grams of a palladium catalyst (10 percent palladium by weight on charcoal) were placed under nitrogen with 700 ml of methanol in a 5-liter autoclave equipped with a magnetic stirrer, and after the activation of the catalyst as described in Example 1, 1320 grams of 5,5-dimethyl-7-cyanoheptene-3-one-2 and 620 ml of methanol were added. After another scavenging with hydrogen, a pressure of 40 atmospheres gauge was produced with hydrogen, and this pressure was held constant by the continual addition of hydrogen. The temperature automatically rose to a maximum of $52°C$. The hydrogenation was completed after 15 minutes. The excess hydrogen was slowly set off and 680 g of ammonia was put into the autoclave. The pressure was brought back up to 100 atmospheres by the addition of hydrogen. At $80°C$ a rapid absorption of hydrogen began, which was compensated by continual addition to keep the pressure in the 80 to 100 atmosphere range. The temperature reaches a maximum of $100°C$. After the absorption of hydrogen ended, the same procedure described in Example 1 was followed, and the filtrate was fractionally distilled through a 50-cm Vigreux column. 840.0 g of 2-amino-5,5-dimethyl-7-cyanoheptane (62.5 percent of the theory), boiling between $90°$ and $92°C$ /o 1 Torr, was obtained as the main product.

EXAMPLE 3

As described in Example 1, the following were placed successively in a 1-liter autoclave with stirrer: 175 ml methanol, 5 g of a platinum catalyst (5 percent platinum by weight on charcoal) and a solution of 125 g of 5,5-dimethyl-7-cyanoheptanone-2 in 200 ml of methanol, and 112 g of ammonia. The hydrogenation was done at 100 atmospheres gauge pressure and $150°C$, and took 1.5 hours. After the refinement process described, 69 g (55.0 percent of the theory) of 2-amino-5,5-dimethyl-7-cyanoheptane were obtained.

EXAMPLE 4

20 g of a palladium catalyst (1 percent palladium by weight on calcium carbonate) were placed under nitrogen in a 5-liter autoclave with 250 ml of methanol, and pretreated in the described manner with hydrogen; then 500 g of 3,5,5-trimethyl-7-cyanoheptanone-2 in 1250 ml of methanol were added. The solution was then saturated with gaseous ammonia until 350 g had been absorbed. The reaction temperature rose to $33°C$ in the meantime. By the addition of hydrogen the pressure was finally brought to 100 atmospheres and the reaction was completed at 100 to 130 atmospheres (130°–140°C). After treatment by distillation, 263.1 g (52.9 percent of the theory) of 2-amino-3,5,5-trimethyl-7-cyanoheptane were obtained at 96°C /o 5 Torr. $C_{11}H_{22}N_2$ (mol. wt. 182):

Calculated: C, 72.50%; H, 12.09%; N, 15.39%.
Found: C, 72.64%; H, 12.00%; N, 15.42%.
$N_d^{20}$: 1.4573

As by-product, 147 g of a substance boiling at 207°–208°C /o 5 Torr was isolated.

EXAMPLE 5

As described in Example 2, 10 g of palladium catalyst (5 percent palladium by weight on calcium carbonate), 750 ml of methanol and 250 g phenyl-(3,3-dimethyl-5-cyanopentene-(1)-Yl)-ketone were put in a 2-liter autoclave, pre-hydrogenated at 40 atmospheres of hydrogen pressure and 36°–40°C, and finally hydrogenated after addition of 200 ml of liquid ammonia at a hydrogen pressure of 130–140 atmospheres at 110°–118°C (hydrogen absorption began at 110 atm/110°C). The 1-amino-1-phenyl-4,4-dimethyl-6-cyanohexane was obtained at B.P. 157°C /o 4 Torr. Titration of the amino group = 99.5%

$C_{15}H_{22}N_2$ (mol. wt. 230): $N_{20}^D$: 1.5186.
Calculated: C, 78.26%; H, 9.55%; N, 12.19%.
Found: C, 78.33%; H, 9.38%; N, 12.10%.

What is claimed is:

1. In the process for the preparation of amino-group-containing nitriles of the general formula

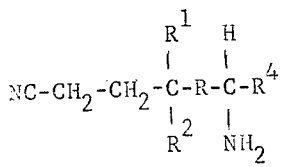

wherein R is $-CH_2CHR^3-$, $R^1$ and $R^2$ are alkyl having 1 to 4 carbon atoms, $R^3$ is hydrogen or an alkyl having 1–4 carbon atoms, and $R^4$ is a hydrogen atom, an alkyl having 1 to 4 carbon atoms or a phenyl radical, and in which $R^3$ and $R^4$ when taken together form a carbocyclic ring having 5 or 6 carbon atoms, by hydrogenating in the fluid state a carbonyl-group-containing nitrile of the general formula

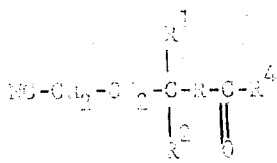

in which R is $CH=CR^3$ or $CH_2-CHR^3-$ and $R^1-R^4$ have the above-given meaning at a temperature of about 60°–180°C, at a hydrogen pressure of at least about 50 atmospheres gauge, and with the addition of an at least stoichiometric quantity of ammonia; the improvement comprising catalyzing the aminative reduction with at least one member selected from the group consisting of platinum and palladium.

2. Process as claimed in claim 1, wherein the nitriles containing carbonyl groups are unsaturated and are first subjected to a preliminary hydrogenation in the presence of a catalyst selected from the group consisting of platinum and palladium in the absence of ammonia, at temperatures of about −20° to 70°C.

3. Process as claimed in claim 1, carried out at 100° to 140°C.

4. Process as claimed in claim 2, wherein said preliminary hydrogenation is carried out at 0° to 40°C.

5. An amino nitrile of the formula:

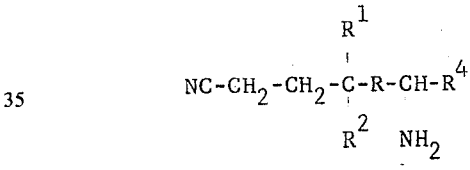

wherein
R is $CH_2-CH_2-$,
$R^1$ and $R^2$ are each methyl
and $R^4$ is phenyl.

* * * * *